US008750830B2

(12) United States Patent
Larocca

(10) Patent No.: US 8,750,830 B2
(45) Date of Patent: Jun. 10, 2014

(54) GROUP-BASED COMMUNICATIONS BETWEEN ASSOCIATED ELECTRONIC DEVICES FOR POLLING AND ACQUIRING FEATURES

(75) Inventor: Scott Douglas Larocca, Altadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 951 days.

(21) Appl. No.: 12/807,396

(22) Filed: Sep. 2, 2010

(65) Prior Publication Data

US 2011/0065462 A1    Mar. 17, 2011

Related U.S. Application Data

(62) Division of application No. 11/395,146, filed on Apr. 3, 2006, now Pat. No. 7,835,736.

(51) Int. Cl.
*H04W 4/00* (2009.01)
*H04W 4/24* (2009.01)

(52) U.S. Cl.
USPC ......... 455/411; 455/414.4; 455/418; 455/406

(58) Field of Classification Search
None
See application file for complete search history.

(56) References Cited

U.S. PATENT DOCUMENTS

| | | | |
|---|---|---|---|
| 6,301,471 B1 | 10/2001 | Dahm et al. | |
| 6,311,063 B1 | 10/2001 | Valliani et al. | |
| 7,035,653 B2 * | 4/2006 | Simon et al. | 455/414.1 X |
| 7,111,044 B2 | 9/2006 | Lee | |
| 2002/0013155 A1 | 1/2002 | Jamthe et al. | |
| 2004/0002350 A1 | 1/2004 | Gopinath et al. | |
| 2004/0048605 A1 * | 3/2004 | Schaefer et al. | 455/414.2 |
| 2004/0202117 A1 | 10/2004 | Wilson et al. | |
| 2006/0089158 A1 | 4/2006 | Lai et al. | |
| 2006/0293057 A1 | 12/2006 | Mazerski et al. | |
| 2008/0146205 A1 | 6/2008 | Aaron | |

FOREIGN PATENT DOCUMENTS

| | | |
|---|---|---|
| EP | 1209932 A2 | 5/2002 |
| EP | 1274270 A1 | 1/2003 |
| EP | 1385301 A2 | 1/2004 |
| GB | 2317073 A | 3/1998 |
| WO | WO 98/10604 | 3/1998 |
| WO | WO 02/44892 A2 | 6/2002 |
| WO | WO 2004/059996 A1 | 7/2004 |

(Continued)

OTHER PUBLICATIONS

International Search Report, and Written Opinion of International Application No. PCT/US2007/006192, Jan. 25, 2008.

(Continued)

*Primary Examiner* — Philip Sobutka
(74) *Attorney, Agent, or Firm* — Farjami & Farjami LLP

(57) ABSTRACT

Methods and systems are provided for managing a group of portable communication devices. In accordance with one implementation, a method is provided for initializing a portable communication device in a group of portable communication devices at a point of activation. The method includes the steps of acquiring, by an initialization computer, a device identifier of the portable communication device, acquiring, by the initialization computer, a group identifier of the group, and associating the portable communication device with the group based on the group identifier. The method may further include accessing, by the initialization computer, a member profile associated with one of the portable communication devices, and storing the member profile in a memory accessible by the portable communication device.

24 Claims, 14 Drawing Sheets

(56) References Cited

FOREIGN PATENT DOCUMENTS

| WO | WO 2004/060004 | A1 | 7/2004 |
| WO | WO 2004/104789 | A2 | 12/2004 |
| WO | WO 2005/034560 | A1 | 4/2005 |
| WO | WO 2006/002048 | A2 | 1/2006 |

OTHER PUBLICATIONS

Anonymous, "Aggregate User Profile," Research Disclosure, Mason Publications, Hampshire, GB, vol. 347, No. 68 (Mar. 1993).
International Search Report of International Application No. PCT/US2007/005942, Sep. 20, 2007.

* cited by examiner

GROUP-BASED COMMUNICATIONS BETWEEN ASSOCIATED ELECTRONIC DEVICES FOR POLLING AND ACQUIRING FEATURES

RELATED APPLICATIONS

This application is a division of U.S. patent application Ser. No. 11/395,146, filed Apr. 3, 2006, now U.S. Pat. No. 7,835,736 which is incorporated by reference in its entirety.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure is related to systems and methods for providing group management and graphical user interfaces for associated electronic devices and, in particular, for providing applications for improved group management and coordination, group data sharing, group monitoring, and graphical user interfaces for associated mobile electronic devices having small-screen electronic displays.

BACKGROUND

As mobile electronic devices, such as cellular telephones, personal digital assistants (PDAs) and pagers, have become more sophisticated, the range of applications that they may offer has become more extensive. Such devices are now often provided with full color, high resolution liquid crystal displays (LCDs) that enable users to view sophisticated graphics, pictures, and video content. Further, new network access protocols, such as the Evolution Data Optimized (EVDO), Wireless Application Protocol (WAP), and i-Mode protocols, allow users to access Internet content through digital cellular networks. Such advances have considerably increased the volume and variety of content available to users of mobile devices. Today, such devices can access much of the same content that was once available only through use of a personal computer connected to the Internet via a land line.

Moreover, a growing number of well-known companies are now entering the mobile phone market as mobile virtual network operators (MVNO). These companies capitalize on their customers' brand loyalty by increasing brand awareness through mobile devices that target the companies' unique customer base, reflect their brand and, over time, strengthen that brand by growing the community. MVNOs do so by bundling mobile electronic devices with brand-specific services, such as ring tones, promotions, rebates, and news feeds.

Because mobile devices are easily transportable, and thus accessible by a user in any situation, availability to such a wealth of content on mobile devices benefits the user. The mobile device user may be a member of an organization or a group (e.g., family, company, team), and may carry and use mobile devices carried by other members. Each of the mobile devices may be carried and used by one of the group members, such as supervisory members (e.g., parent, employer, team leader) and supervised members (e.g., child, employee, team member).

A mobile device user now has mechanisms to access the same types of content on mobile devices as on personal computers. Furthermore, a mobile device user in a group may also communicate with other members of that group via associated mobile devices at a special rate. However, the traditional approach to group data sharing, group communication, and group management, particularly in a brand-specific context, is significantly deficient when applied to mobile devices, and conventional mobile device applications are not adapted to manage, coordinate, monitor, and share data among mobile devices that are associated in a group.

Accordingly, there is a need for improved mobile device applications and graphical user interfaces that provide for management and monitoring of electronic devices that are associated in a group and enable coordination and data sharing among the group's electronic devices.

SUMMARY

Consistent with the present disclosure, a method for initializing a portable communication device in a group of portable communication devices at a point of activation is provided. The method includes acquiring, by an initialization computer, a device identifier of the portable communication device, acquiring, by the initialization computer, a group identifier of the group, and associating the portable communication device with the group based on the group identifier. The method may further include the steps of accessing, by the initialization computer, a member profile associated with one of the portable communication devices, and storing the member profile in a memory accessible by the portable communication device.

According to an embodiment of the invention, a method for acquiring one or more features for a portable communication device in a group is provided. The method includes determining a list of features available for acquisition based on a device identifier of the portable communication device, providing the list of available features to a user. The method may further include the steps of selecting a feature from the list of available features and acquiring the selected feature.

Consistent with yet another embodiment of the invention, a method for sharing data among one or more portable communication devices in a group is provided. The method includes providing a list of data sharing options including generating new data and sharing a document containing the data with the portable communication devices and selecting a data sharing option. The method may further include the steps of determining whether the primary portable communication device has an access privilege to share data with the portable communication devices in the group, and if it is determined that the primary portable communication device has the access privilege, performing the selected data sharing option.

Consistent with yet another embodiment of the invention, a method for broadcasting a message from a primary portable communication device to one or more portable communication devices in a group is provided. The method includes selecting at least one target portable communication device from the portable communication devices and sending the message to the target portable communication device, wherein the message requires an acknowledgement of the message from the target portable communication device, and wherein the message suspends user activity on the target portable communication device prior to the acknowledgement.

Consistent with yet another embodiment of the invention, a method for conducting a poll by a primary portable communication device with one or more portable communication devices in a group is provided. The method includes selecting a plurality of target portable communication devices from the portable communication devices, sending the poll to the target portable communication devices, and receiving one or more votes from the target portable communication devices in response to the poll. The method may further include the steps of determining whether a poll completion threshold has been reached, and if it is determined that the poll completion threshold has been reached, sending a poll result to the target portable communication devices.

Consistent with the present disclosure, a system is also provided for initializing a portable communication device in a group of portable communication devices at a point of activation. The system includes a device identifier acquisition module for acquiring a device identifier of the portable communication device, a group identifier acquisition module for acquiring a group identifier of the group, and a grouping module for associating the portable communication device with the group based on the group identifier. The system may further include a profile accessing module for accessing a member profile associated with one of the portable communication devices, and a profile storing module for storing the member profile in a memory accessible by the portable communication device.

Additional objects and advantages of the present disclosure will be set forth in part in the description which follows, and in part will be obvious from the description, or may be learned by practice of the embodiments. The objects and advantages of the present disclosure will be realized and attained by means of the elements and combinations particularly pointed out in the appended claims. It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments consistent with the present description and together with the description, serve to explain the principles of the invention.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Figure 1A:
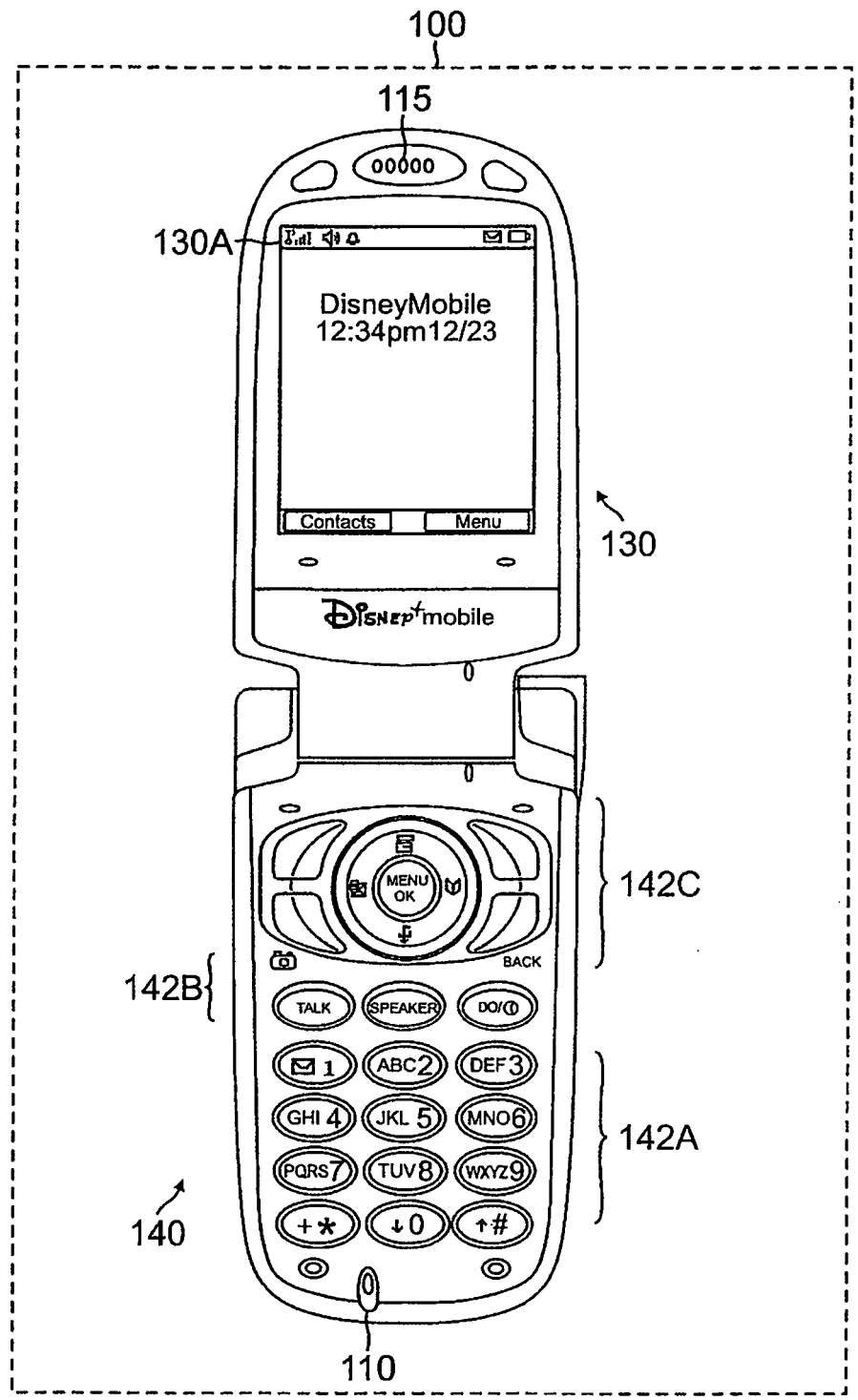
FIGS. 1A-B show external features of an exemplary electronic device, consistent with the present disclosure.
Figure 1B:
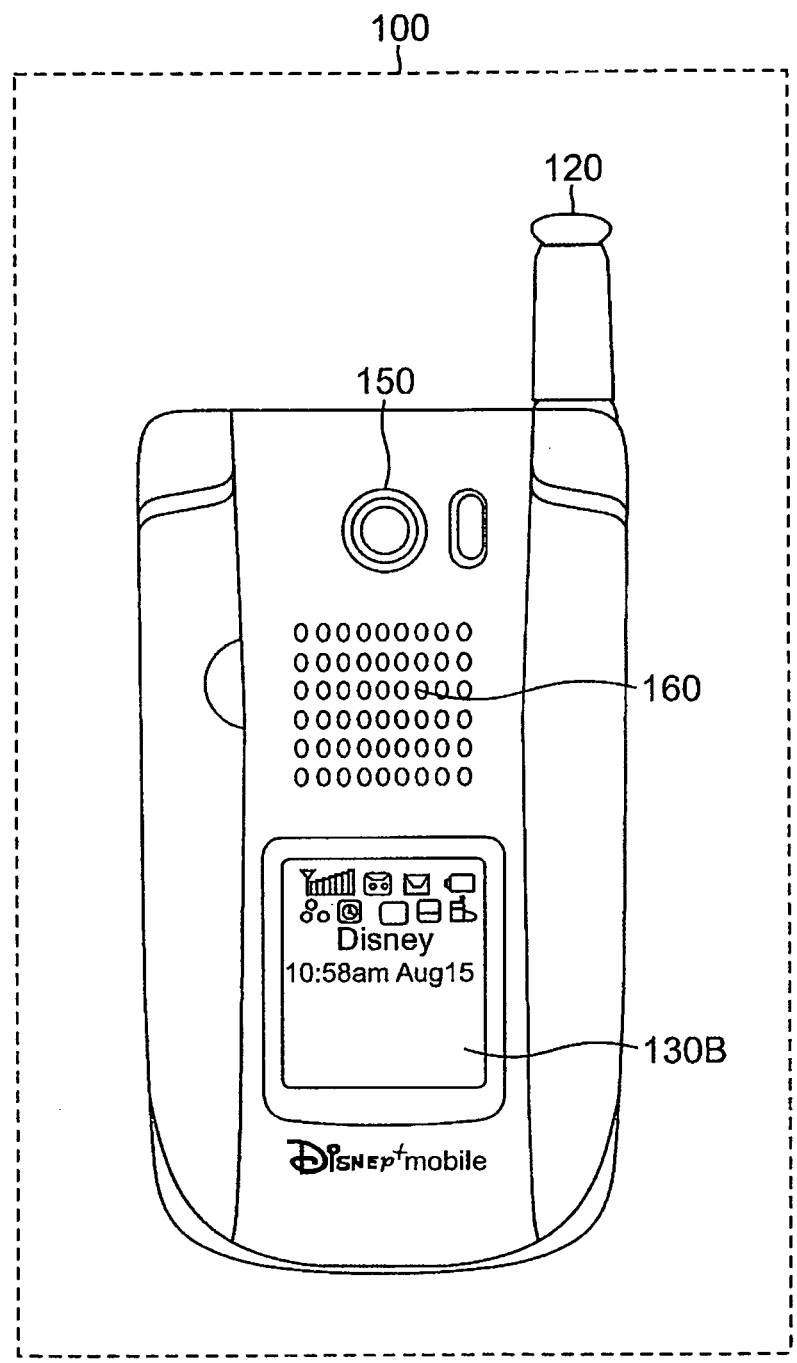

FIGS. 1A-B show external features of an exemplary device 100 consistent with the present disclosure. As shown in FIGS. 1A-B, device 100 may be configured as a foldable, or "clam shell" style, web-enabled mobile telephone (such as the model MM-8300 Multimedia Phone available from Sanyo© North America Corporation) having an open position (FIG. 1A) and a closed position (FIG. 1B). However, it should be noted that systems and methods consistent with the present disclosure may be used with electronic devices configured using different hardware without departing from the scope of the present invention.

For example, systems and methods of the present disclosure may be applied to other mobile electronic devices, such as PDAs, pagers, etc., and to other handheld electronic devices, such as the iPod™ digital music player (available from Apple© Computer, Inc.). Other suitable hardware platforms will be apparent to those skilled in the art. For instance, device 100 may alternatively be configured as a laboratory instrument, television set, or set-top box (such as the TiVo© digital video recorder, available from TiVo© Inc.). Finally, although systems and methods consistent with the present disclosure may be particularly well suited for use with electronic devices having small-screen displays, such systems and methods may also be applied to devices having relatively large screens, such as personal computer and television displays.

As shown in FIG. 1A, exemplary device 100 may include a microphone 110, a speaker 115, a display 130, and an input device 140. As shown FIG. 1B, device 100 may also include an antenna 120, a camera 150 for capturing still or video images, and a speakerphone 160 for hands-free communication.

Display 130 may be any type of graphical display suitable for displaying a graphical user interface consistent with the present disclosure. Display 130 may include a plurality of displays, such as a main display 130A, active when device 100 is in the open position (FIG. 1A), and, in some embodiments, a smaller sub-display 130B, active when device 100 is in the closed position (FIG. 1B). Both main display 130A and sub-display 130B may be implemented using full-color (e.g., 262,144 colors) active matrix LCD displays. However, one skilled in the art will understand that other types of displays (e.g., monochrome displays) may be used.

In exemplary embodiments of the present disclosure, display 130 may be less than five inches in its largest dimension. In particular, as in device 100, both displays 130A and 130B may be less than three inches in their largest dimension. For example, main display 130A may be a 2.1" thin film transistor (TFT) QVGA (240×320 pixels) display, and sub-display 130B may be a 1.1" TFT display. In some embodiments, display 130 may include a touch screen display capable of both outputting information to the user and receiving input from the user. For example, main display 130A of device 100 may be implemented using such a touch screen display.

Input device 140 may be implemented using one or more user input devices adapted for data or command entry. As shown in FIG. 1A, input device 140 may include a keypad adapted for one-handed use. A keypad may include, for example, a 3×4 button alpha-numeric telephone keypad 142A. Alternatively, a keypad may include a full-sized keyboard (such as a "QWERTY" keyboard, not shown). A keypad may also include a plurality of telephone function inputs 142B. As illustrated in FIG. 1A, for example, the keypad may include a TALK (or SEND) key, for initiating telephone communications, a SPEAKER key for actuating speakerphone 160, an END key for ending telephone communications and other applications, as well as a key for actuating camera 150 (denoted in FIG. 1A by a camera icon).

Figure 1C:
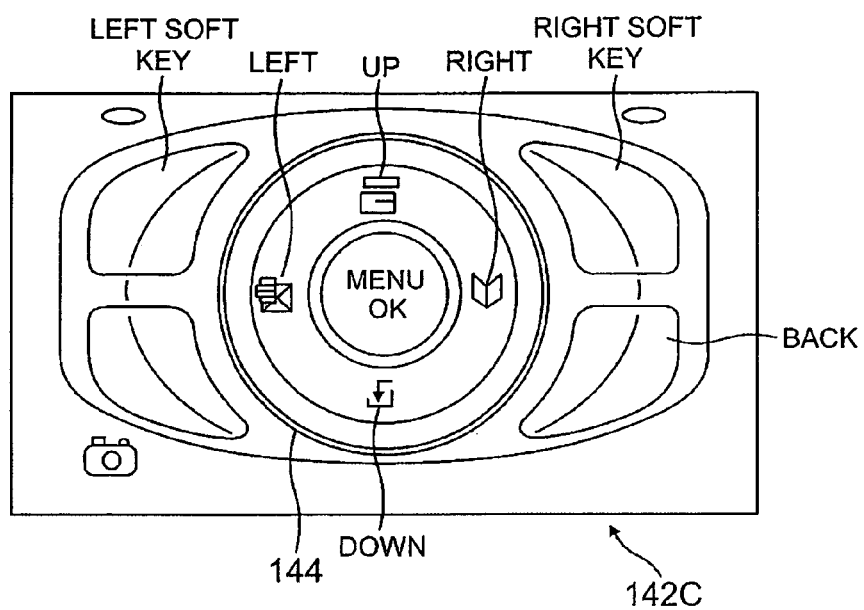
FIG. 1C illustrates a keypad including a plurality of navigation inputs of an exemplary electronic device.

In an exemplary embodiment of the present disclosure, keypad 142 may also include a plurality of navigation inputs 142C. As shown in FIG. 1C, navigation inputs 142C may include a directional input 144 for positioning the cursor. Directional input 144 may include a four-way rocker switch having UP, DOWN, LEFT, and RIGHT directional keys. However, it is to be understood that directional input 144 may be implemented by any suitable technology. For example, directional input 144 may be implemented by discrete buttons, a joystick, touchpad, trackball, or other manual input suitable for cursor navigation, such as the Jog Dial™ actuator available from Sony™ Corporation. Alternatively, display 130A may be configured as a touch screen display, and cursor navigation accomplished by the user touching the surface of the display, e.g., with a finger or stylus. In some embodiments, device 100 may include software to allow cursor navigation by voice command, e.g., via microphone 110.

Further as shown in FIG. 1C, navigation inputs 142C may include a LEFT SOFTKEY, a RIGHT SOFTKEY, and a BACK key. The functions of LEFT SOFTKEY and RIGHT SOFTKEY may vary depending upon the user's location within the application, and the functions at any given point in the application may be dynamically indicated on the display, e.g., by softkey labels 132 at the bottom of main display 130A. As shown in FIG. 1A, for example, LEFT SOFTKEY is labeled "Contacts" and RIGHT SOFTKEY is labeled "Menu."

Navigation inputs 142C may perform different functions in different applications, and may perform different functions at different points within a single application. The functions of navigation inputs 142C within the exemplary graphical user interface is described below in relation to other figures.

Figure 2:
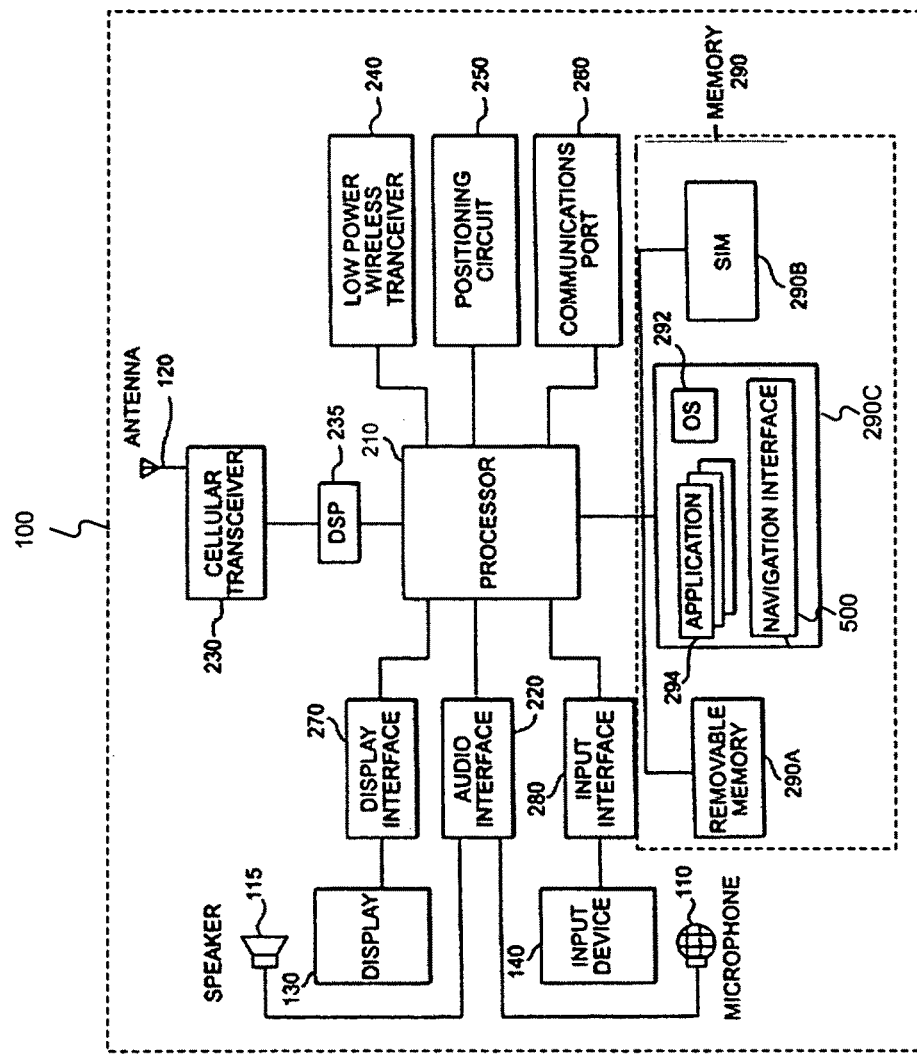
FIG. 2 is a functional block diagram of an exemplary electronic device.

FIG. 2 is a functional block diagram of an electronic device consistent with the present disclosure, such as exemplary device 100. As shown in FIG. 2, exemplary device 100 may include a processor 210, an audio interface 220, a cellular transceiver 230, a digital signal processor (DSP) 235, a low-power wireless transceiver 240, a positioning circuit 250, a communications port 260, a display interface 270, an input interface 280, and a memory 290 (collectively referred to as functional components). However, it will be understood by those skilled in the art that exemplary device 100 could be implemented in other functional configurations, and may include other functional components known to those skilled in the art, without departing from the scope of the present disclosure.

Processor 210 may be implemented using a microprocessor or other controller that may be selectively activated or configured by a computer program to perform one or more methods consistent with the present disclosure. As shown in FIG. 2, processor 210 may be operatively coupled to control functional components 220-280, as described below.

Audio interface 220 may include appropriate drivers for driving microphone 110, speaker 115, and/or speakerphone 160 for use in voice communications. In some embodiments, processor 210 may include an application to enable voice-activated communication, e.g., voice recognition of commands, through audio interface 220.

Cellular transceiver 230 may be operatively coupled to antenna 120 for transmitting and receiving RF communication signals. For example, cellular transceiver 230 may be implemented using a CDMA, TDMA, and/or GSM compatible transceiver operable to transmit and receive digital and/or analog cellular telephony and/or data signals.

DSP 235 may be operatively coupled to enable communication of digital signals between processor 210 and transceiver 230. DSP 235 may decode or otherwise process digital communication signals received through cellular transceiver 230, as well as encode signals to be transmitted by transceiver 230. For example, DSP may digitally encode an analog voice signal received from audio interface 220.

Low-power wireless transceiver 240 may be operable to enable communications with low-power wireless devices. For example, low-power transceiver 240 may be configured to allow device 100 to communicate with, e.g., headsets, keyboards, printers, etc., using the Bluetooth™, IEEE 802.11, infrared, or other low-power wireless communications protocol.

Positioning circuit 250 may be operable to provide information related to the geographic location of device 100. For example, positioning circuit 250 may receive a plurality of signals provided by, e.g., the Global Positioning System (GPS) or wireless base stations, and calculate the position of device 100, for example, based on triangulation of the signals.

Communications port 260 may provide a wired communication link between processor 210 and another electronic device, such as a personal computer. Communication port 260 may be implemented using any suitable wired communication protocol, such as USB, RS-232, or other standard.

Display interface 270 may include appropriate drivers for driving display 130 to output graphics and/or video displays in accordance with control signals provided by processor 210. Input interface 280 may include an appropriate encoder for encoding input received from input device 140 (e.g., keypad 142) in a form suitable for interpretation by processor 210.

Memory 290 may be implemented using a suitable computer-readable media operatively connected to processor 210. Consistent with the present disclosure, a computer readable medium may be any type of memory, such as read-only memory (ROM), random-access memory (RAM), etc., that is capable of carrying information that may be used to processor 110 to perform methods consistent with the present disclosure. For example, computer readable media may be implemented using physical media (e.g., a punch card), magnetic media (e.g., a magnetic disk or tape), optical media (e.g., an optical disk), a carrier wave (e.g., from a computer network, such as a wireless network or the Internet), etc.

As shown in FIG. 2, memory 290 may include a removable memory 290A and a Subscriber Identity Module (SIM) 290B. Removable memory 290A may include a compact flash memory stick or card (e.g., a miniSD removable memory card), e.g., for storing still picture and/or video taken using camera 150. SIM 290B may be used to identify device 100 to a wireless services provider to allow the user to access subscribed services via device 100. In order to identify the subscriber, SIM 290B may contain an identifier, such as an International Mobile Subscriber Identity (IMSI) number, that is unique to each subscriber.

Consistent with the present disclosure, memory 290 may also include a system memory 290C for storing software and/or data for configuring processor 210 to perform methods consistent with the present disclosure. As shown in FIG. 2, system memory 290C may store an operating system (OS) 292 and one or more software applications 294. Operating system 292 may control the basic operation of functional components 210-290, as well as the initiation and operation of applications 294. For example, operating system 292 may be implemented using the SmartPhone or Symbian operating systems (available from Microsoft® Corporation and Symbian™ PLC, respectively), or some other operating system suitable for the particular configuration of device 100.

Software applications 294 may include one or more programs, which control the operation of functional components 210-290. For example, applications 294 may include applications for sending and/or receiving data, e.g., according to the short messaging service (SMS), enhanced messaging service (EMS), or multimedia messaging service (MMS) protocols, and may also include applications for sending and/or receiving data and/or applications according to, e.g., the EVDO, WAP, or i-Mode mobile device protocols for accessing the Internet.

In particular, applications 294 may include user interfaces 500 and 510 for performing one or more methods consistent with the present disclosure. Exemplary user interface 500 is described below in connection with FIG. 5A.

Figure 3:
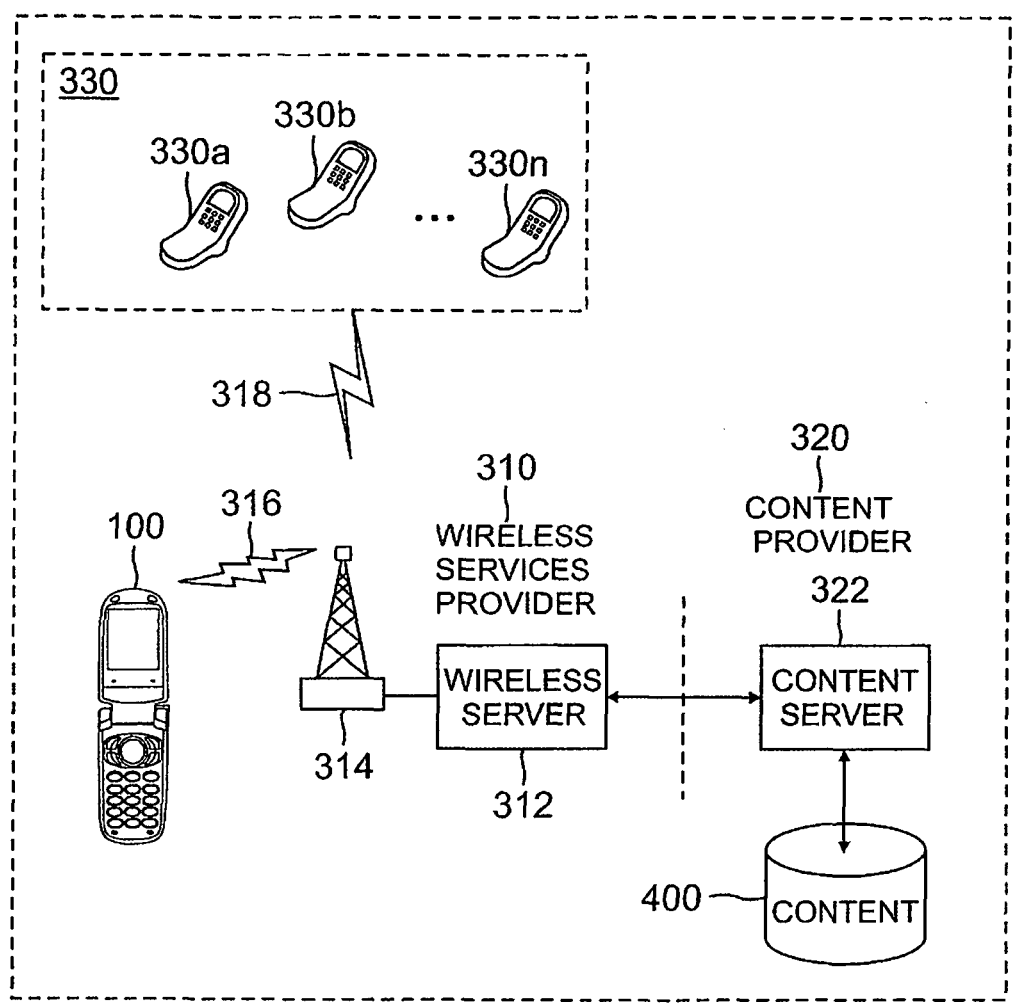
FIG. 3 shows a functional block diagram of an exemplary mobile communications network, consistent with the present disclosure.

FIG. 3 shows a functional block diagram of an exemplary mobile communications network 300 consistent with the present disclosure. As shown in FIG. 3, mobile communications network 300 may include a wireless services provider 310 and a content provider 320.

Wireless services provider 310 may provide cellular telephony or other digital communications services to users of mobile electronic devices, such as device 100. Wireless services provider 310 may be a cellular telephone service provider (such as Sprint Nextel© Corporation), a personal communications services (PCS) provider, or a provider of other wireless services. Wireless services provider 310 may operate a wireless server 312 and a network of base stations 314. As shown in FIG. 3, device 100 may communicate with wireless server 312 using a "client-server" software architecture over a wireless link 316 through base stations 314. Wireless server 312 may also communicate with other electronic devices 330 over a second wireless link 318 through base stations 314. Electronic devices 330 may be any portable communication device, e.g., cellular phones, web-enabled mobile telephone, PDAs, pages. It should be noted that systems and methods consistent with the present disclosure may be used with electronic devices configured using different hardware without departing from the scope of the present invention.

Content provider 320 may be an internet service provider (ISP) or other provider of digital content. Content provider 320 may operate a content server 322 for providing access to digital content 400 stored in computer readable media. Wireless services provider 310 may be linked to content provider 320 through any appropriate communications link 324, such as a WAP gateway, a socket connection, etc.

In an embodiment of the present disclosure, wireless services provider 310 may retrieve digital content from content server 322 over communications link 324 and provide such content to device 100 over wireless link 316. However, it is to be understood that the present disclosure is not limited to such an arrangement, and that device 100 may obtain content 400 by other mechanisms. For example, device 100 may be linked to content provider 320 by a land line and, in some embodiments, some or all of content 400 may be stored in a memory (e.g., system memory 290C) of device 100.

Content 400 provided by content provider 320 may be any type of content, such as news, weather, stock quotes, local content, etc., suitable for access using a mobile electronic device, such as device 100. The content 400 provided by content provider 320 may also be any type of content specific to the user, such as location, subscription parameters, messages, and/or shared data accessible to devices 100 and 330. In an exemplary embodiment of the present disclosure, the content may be family-related content provided by Disney Mobile™.

Figure 4A:
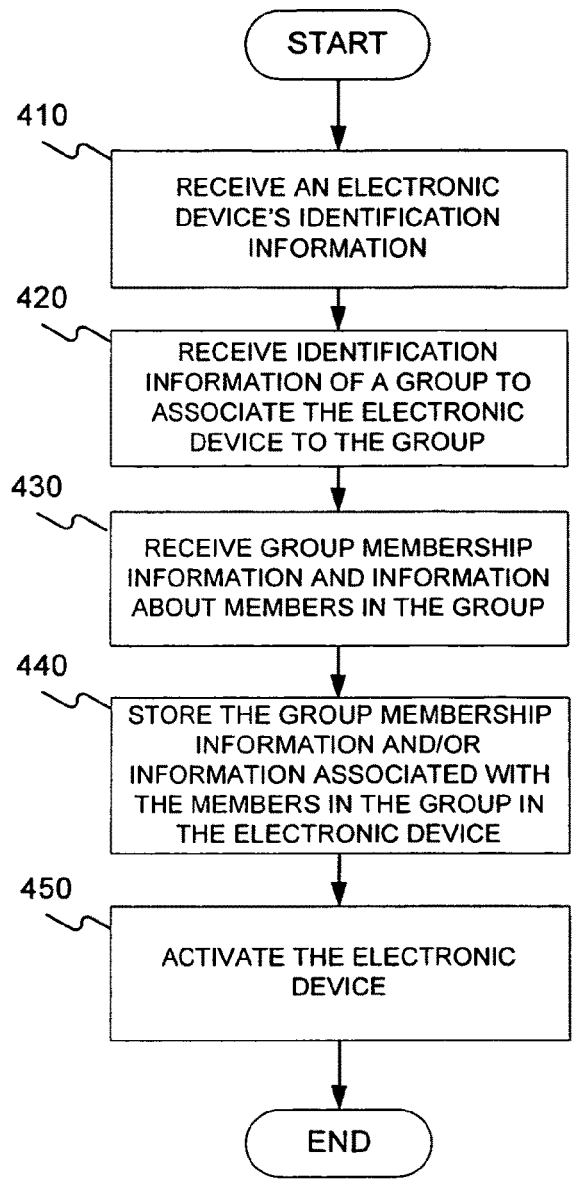
FIG. 4A illustrates a flow diagram of an exemplary method for loading, initiating, and/or customizing group membership information, profiles of group members, and a group-oriented application suite for managing and monitoring a group of portable communication devices and for providing tools for coordinating, and data sharing among the group's portable communication devices.
Figure 11:
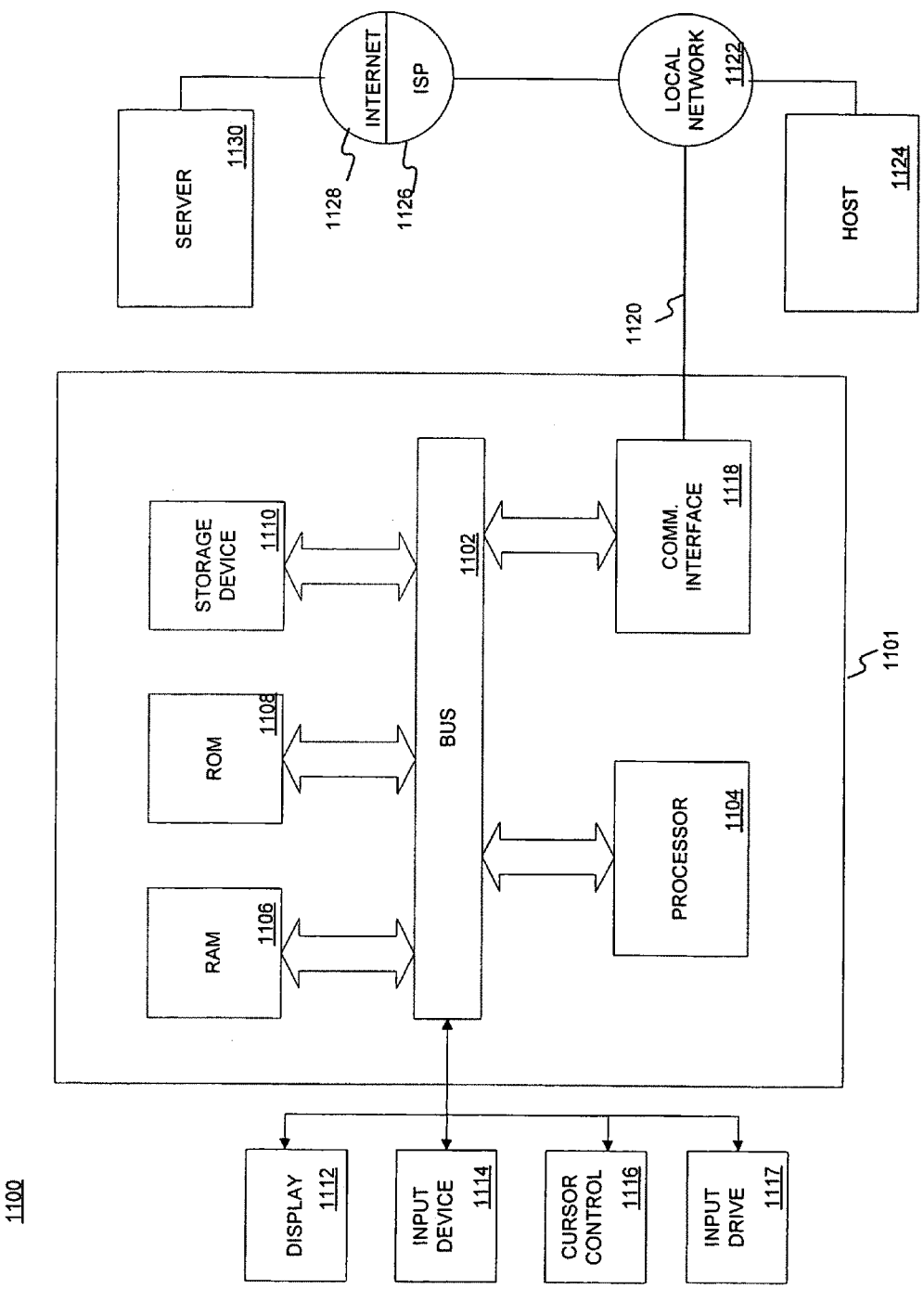
FIG. 11 is a block diagram illustrating a computer system in which an embodiment consistent with the invention may be implemented.

FIG. 4A illustrates a flow diagram of an exemplary method for uploading, initiating, and/or customizing group membership information, profiles (e.g., member name, gender, age, contact information, level of access privilege, preferences) of group members, and a group-oriented application suite for managing and monitoring devices (e.g., device 100 and devices 330) that are associated in a group and for providing tools for coordinating and sharing data among the group's devices. Consistent with an embodiment of the invention, an operator of an electronic device provisioning system (e.g., server 1100 as illustrated in FIG. 11) may upload, initialize, and/or customize the group membership information, the profiles of group members, the group-oriented application on device 100 at, for example, the point of sale, the point of activation, or upon request by the purchaser or user of the devices (e.g., device 100 and devices 330).

In stage 410, the operator enters an electronic device's identifier information into the provisioning system. The term "enter" may include manual data entry, bar code scan, upload over a wired or wireless data connection, transmission over a wired or wireless network, download from a data repository or other forms of computer memory, or in any other manner. The operator may enter the identifier information of a group into the provisioning system in stage 420 to associate the electronic device to the group.

In stage 430, the operator may enter group membership information, such as a list of members (e.g., users of devices 330) in the group and the members' roles (e.g., supervisory, basic) in the group. The operator in stage 430 may also enter and/or customize information and profile associated with each member in the group, for example, the member's name, gender, age, date of birth, contact information (e.g., phone number, electronic mail address, instant messenger identification), access privileges (e.g., supervisory, basic, limited, unlimited, administrative), and preferences (e.g., nickname, favorite color, favorite television show, favorite movie, preferred theme, preferred nickname, preferred ring tone, preferred graphical caller identification).

Next, in stage 440, the operator may store the group membership information and/or information associated with each of the one or more members in the group in a computer memory accessible by device 100 (e.g., content 400, a memory in wireless server 312, memory 290 of device 100). The operator may also load and/or activate one or more applications on device 100 and set up the applications for device 100. Applications include, for example, a storefront application for purchasing features, utilities, and additional applications (as illustrated in FIGS. 7A-D); a data sharing application for sharing data with group members (as illustrated in FIGS. 9A-D); a member locator for locating a group member; a group manager for managing a subscription account for the group and connectivity information, connectivity allowance, and connectivity restriction of the group members; a meal planner for managing and organizing meals for the group; a group planner for organizing and coordinating group-related activities; a group messenger for sending and receiving messages among the group members; and an appointment reminder for tracking appointments of the group members. Then, in stage 450, the operator may activate device 100 to use one or more services (e.g., wireless services provided by wireless services provider 310), if not already activated.

The exemplary method illustrated in FIG. 4A minimizes the amount of data entry required of the devices' purchaser or user, which may facilitate and promote the sale of the devices and services associated with the devices. Moreover, the exemplary method facilitates group-related communications and activities by providing the user with convenient means for contacting group members and managing group-related information, for instance, by prioritizing the group members' contact information in a contact list stored in device 100, by providing tools for communicating with group members (e.g., tools that allow the user to send a new or pre-recorded voice or text message to one or more selected group members), by providing tools for managing the contact list, or other similar ways.

Figure 5A:
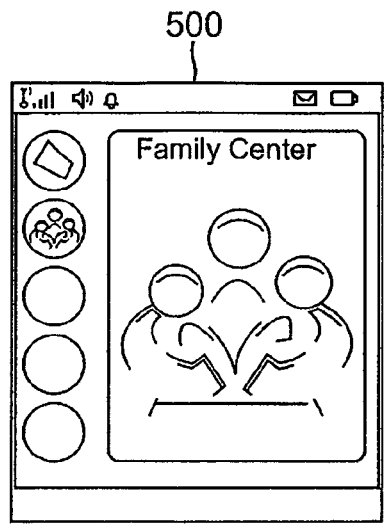
FIG. 5A shows a plurality of exemplary screen displays for initiating a group-oriented application for contacting, managing, and/or sharing data with a group of portable communication devices, consistent with the present disclosure.
Figure 5B:
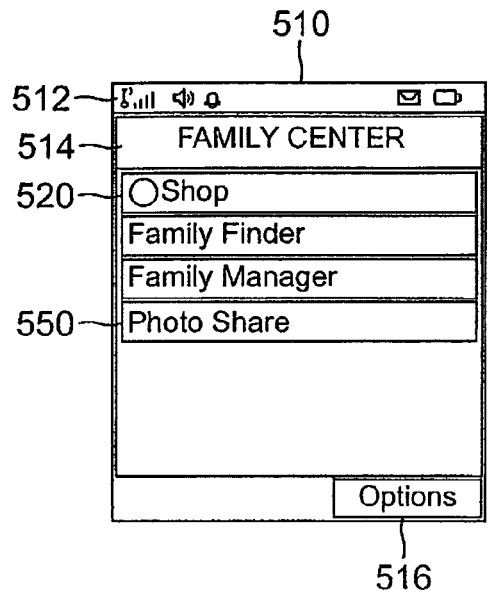
FIG. 5B shows a plurality of exemplary screen displays for selecting a group-oriented application for contacting, managing, and/or sharing data with a group of portable communication devices, consistent with the present disclosure.

The exemplary method may also provide the user with means to access and manage device 100 and membership information associated with the user, for instance, by providing tools that allow the user to view and/or edit the member profile, locate and/or apply a theme (e.g., background color, wallpaper, font style, font color, ring tone, menu icons, color scheme, greeting) for device 100, view the connectivity usage (e.g., user interface 560 as illustrated in FIG. 5B), or set connectivity usage alerts based on allowed usage and actual usage.

In an embodiment consistent with the present disclosure, the theme applied to device 100 may affect many or all user interfaces displayed on device 100. The theme applied to device 100 may be selected by the user or automatically selected based on the user profile or previously applied themes. For example, a theme based on the Little Mermaid™ may be automatically applied to device 100 if the user profile indicates that the user of device 100 is a nine year old female who likes Disney™ movies. The user may locate and download themes from wireless service provider 310 and/or content provider 320. When the user sends a request to locate themes to download, wireless service provider 310 or content provider 320 may send to device 100 sample themes based on the user profile. For example, if the user of device 100 is a twenty-five year old male who enjoys collegiate sports, wireless service provide 310 or content provider 320 may send one or more college sport-based themes to device 100 to the user. The user may also customize a theme and upload the customized theme to content provider 320 to store and/or share the customized theme with other members of the group.

Figure 4B:
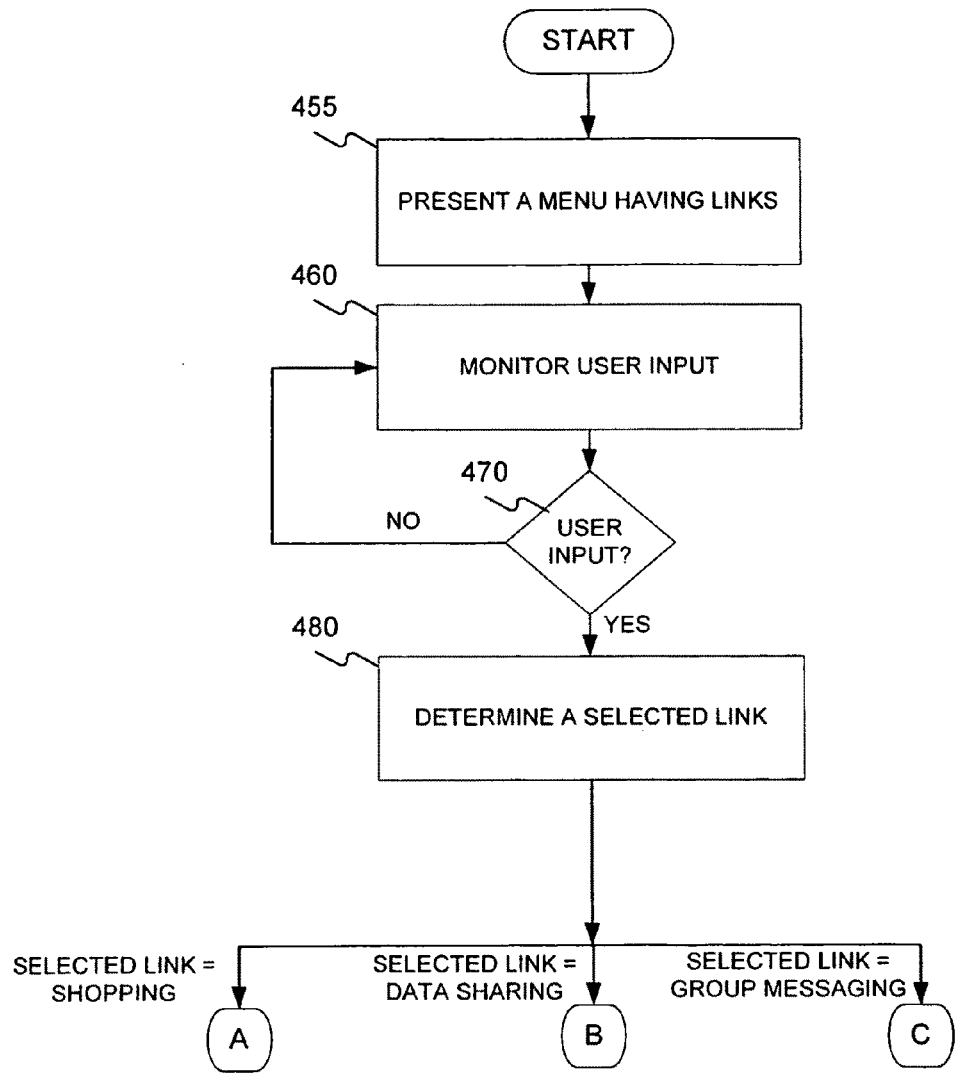
FIG. 4B shows a flow diagram of an exemplary method for initiating and selecting a group-oriented application for contacting, managing, and/or sharing data with a group of portable communication devices.
Figure 5C:
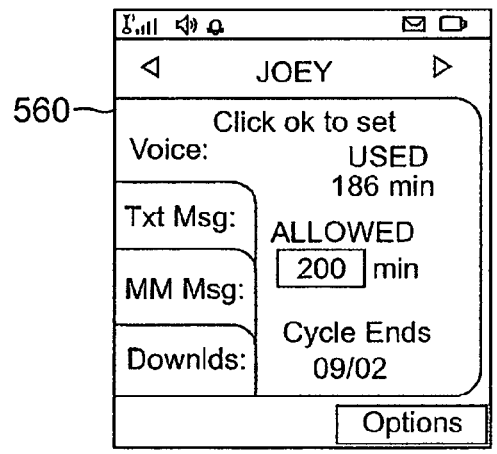
FIG. 5C shows an exemplary screen display for monitoring connectivity information of a portable communication device, consistent with the present disclosure.

FIG. 4B illustrates a flow diagram of an exemplary method for initiating and selecting a group-oriented application suite for contacting, managing, and/or sharing data with a group of portable communication devices. Consistent with an embodiment of the invention, a user (e.g., an operator of device 100) may select and initiate a group-oriented application through graphical user interfaces. The user may select and initiate a group-oriented application by, for example, operating keypad 142, issuing voice command into microphone 110, transmitting RF communication signals to antenna 120, and/or operating display 130 (e.g., a touch-screen). In stage 455, device 100 presents to the user a list of links (e.g., links 520 and 550, as illustrated in FIG. 5), comprising access links to group-oriented applications. In stage 460, device 100 monitors input from the user via, for example, operation of keypad 142, voice command received by, e.g., microphone 110, RF communication signals received by, e.g., antenna 120, and/or operation of display 130 (e.g., a touch-screen). Next, in stage 470, if device 100 detects no user input, the method returns to stage 460 to continue monitoring user input. However, if device 100 detects input from the user, in stage 480 device 100 determines a selected link (e.g., links 520 and 550).

As shown in the exemplary list of graphical user interface 510, the user may initiate an application for shopping and purchasing additional utilities and features by selecting link 520. When the user selects link 520, device 100 proceeds to stage 600 (shown in FIG. 6) to allow the user to shop for and purchase utilities and features for the group or the group's devices (e.g., device 100 or devices 330). The user may initiate a data sharing application for sharing data (e.g., photos, sound clips) with devices 330 by selecting link 550. When the user selects link 550, device 100 proceeds to stage 800 in FIG. 8 to allow the user to share data with devices 330.

FIGS. 5A and 5B show two screen displays of exemplary user interfaces 500 and 510 for accessing content 400. As shown in FIG. 5B, screen display 510 may include a status portion 512, a content portion 514, and an options portion 516. Status portion 512 may be used to indicate the status of components or applications of device 100. For example, status portion 512 may display icons and/or text indicative of current cellular signal strength and/or battery power, or a message waiting indicator. Content portion 514 may be used to present application links 520 and 550 and/or display application content pages, such as exemplary content pages shown in FIGS. 5A-B, 7A-D, and 9A-D. Options portion 516 may be used to present to the user additional options specific to each application, and may be initiated, for example, via RIGHT SOFTKEY as shown in FIG. 1C.

In an exemplary embodiment of the present disclosure, the positions and dimensions of screen portions 512, 514, and 516 may be persistent throughout navigation interface. That is, the status, content, and options portions 512, 514, and 516 may maintain positions and dimensions on display 130A, regardless of the location or phase of the applications.

In some embodiments of the present disclosure, navigation interface 500 may be configured to be selectively invoked by the user. In such an embodiment, OS 292 may invoke user interface 500 upon entry of an appropriate command by the user. In an exemplary embodiment of the present disclosure, for example, user interface 500 may be selectively invoked by entering an UP directional input from an idle screen of OS 292. In an alternative embodiment, navigation interface 500 may be invoked automatically by OS 292 on startup of device 100. For example, OS 292 may be configured to invoke navigation interface 500 as the default graphical user interface for device 100.

Upon invocation, user interface 510 may obtain frequently used data or content from content provider 320. For example, user interface 510 may establish a wireless link 316 with wireless server 312 in order to obtain certain data from content server 322 via wireless link 316. In an exemplary embodiment of the present disclosure, for instance, user interface 510 may send a query to content server 322 via wireless link 316. In the query, navigation interface may pass an identifier to content server 322. For example, the identifier may be an IMSI number stored on SIM 290B; however, any identifier sufficient to identify the query as coming from a subscriber may be used.

Content server 322 may then determine whether the identifier corresponds to a subscriber to the applications, and, if so, the subscriber's level of access (e.g., whether the subscriber has supervisory or basic access). If content server 322 determines that the identifier does not correspond to a subscriber, then content server 322 may deny access to application content 400. Conversely, if content server 322 determines that the identifier corresponds to a subscriber of the applications, then content server 322 may reply by transmitting certain startup content to device 100.

In order to allow user interface 510 to quickly present frequently used content to the user, for example, content server 322 may transmit data necessary for the display of a startup content page and/or frequently accessed content in response to the initial query. In the exemplary Disney Mobile™ applications, for example, content server 322 may transmit the latest version of a startup content page as well as other time sensitive content necessary for the display of frequently used content pages, such as subscribers associated with devices 330. Upon receiving the startup content, user interfaces (e.g., user interfaces 500 and 510) may save a copy of such content, e.g., in a RAM portion of system memory 290C. User interfaces (e.g., user interfaces 700 and 900 in FIGS. 7A and 9A, respectively) may then use the startup content to display application startup screens.

User interface 510 may then search for the requested content page in system memory 290C. If the requested content page is not found within system memory 290C, then navigation interface may request the page from content server 322, as described above. Upon retrieving the requested page from either system memory 290C or content server 322, device 100 may display the startup page (e.g., user interfaces 700 and 900) for the requested application.

User interfaces may also provide an "Option" input for enabling the user to retrieve or modify application options and/or parameters. In the exemplary embodiment, for example, this function may be assigned to the RIGHT SOFT-KEY (as denoted in FIG. 1C). The function performed by the option input may vary based upon the state of the content portion. If content portion is displaying the locator application, then, upon selection of the "Option" input, device 100 may open an options menu that is contextually relevant to the locator application.

Application for Shopping and Purchasing Features and Utilities

Figure 6:
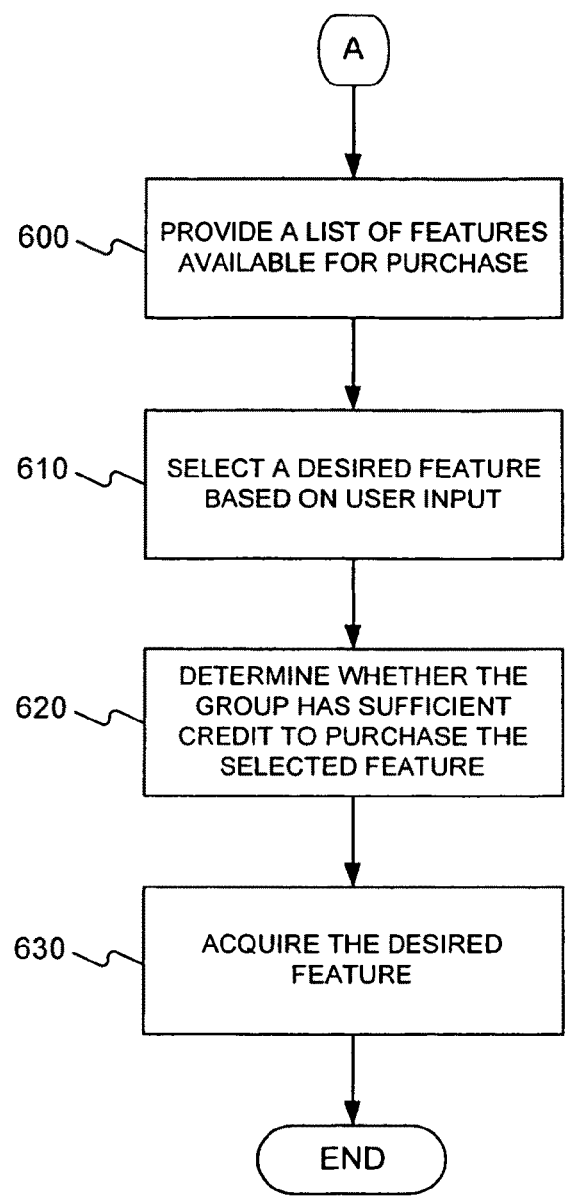
FIG. 6 illustrates a flow diagram of an exemplary method for shopping and purchasing features and utilities for one or more portable communication devices associated in a group, consistent with the present disclosure.
Figure 7A:
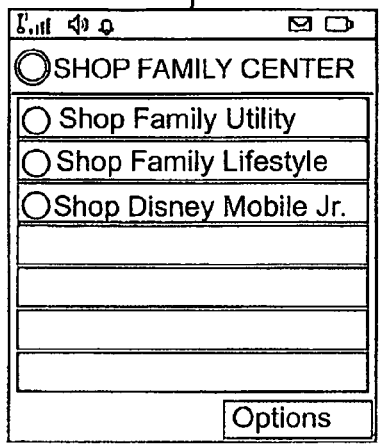
FIGS. 7A-D show exemplary screen displays for shopping and purchasing features and utilities for one or more portable communication devices associated in a group, consistent with the present disclosure.
Figure 7B:
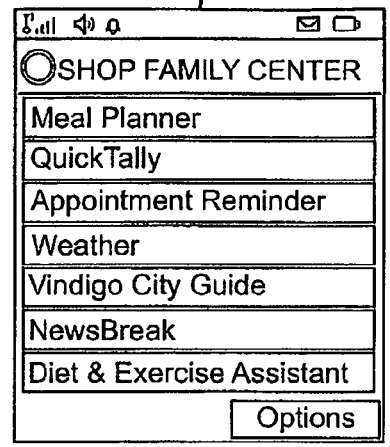
Figure 7C:
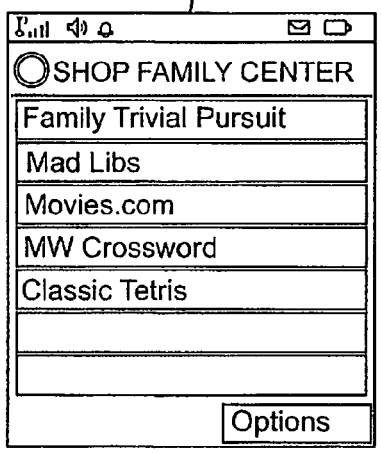
Figure 7D:
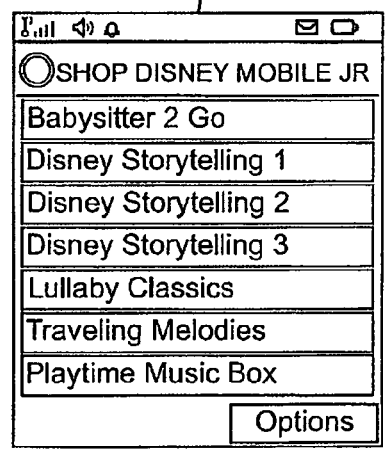

The operation of exemplary user interfaces 700-730 (shown in FIGS. 7A-7D) will now be described with reference to FIG. 6. FIG. 6 illustrates a flow diagram of an exemplary method for shopping and purchasing features and utilities for devices in the group (e.g., device 100 and devices 330) associated with device 100. In stage 600, device 100 may retrieve, from system memory 290C, a list of features and utilities available for purchase. If the requested list is not found within system memory 290C, then device 100 may request the page from content server 322. The list of features and utilities may be customized and targeted based on the user profile or the user's previous purchases. For example, if the user profile indicates that the user is a thirty-five year old female with two young children, the list may include and/or prioritize family-oriented features and utilities targeted toward the user. Upon retrieving the list from either system memory 290C, content server 322, or any other source, device 100 may display the list or lists of the features and utilities available for purchase (e.g., Shop Family Center 700, Shop Family Utility 710, Shop Family Lifestyle 720, and Shop Disney Mobile Jr. 730 as shown in FIGS. 7A-D) to the user.

Next, in stage 610, device 100 may select, based on the user's input, a desired feature or utility that the user wishes to purchase. The user may select a desired feature or utility by, for example, operating keypad 142, issuing voice command into microphone 110, transmitting RF communication signals to antenna 120, and/or operating display 130 (e.g., a touch-screen). In stage 620, device 100 may determine whether an account associated with the group of devices has sufficient credit (e.g., account balance, line of credit, credit card information, and the like) for acquiring the selected feature or utility. If the subscription account has insufficient credit, device 100 may inform the user that the subscription account has insufficient credit and may prevent the user from acquiring the selected feature and/or utility. If the subscription account has insufficient credit, device 100 may also prompt the user to purchase credit. Alternatively, if the account has sufficient credit for acquiring the selected feature, the application for shopping for and purchasing features proceeds to stage 630 to acquire the selected feature or utility.

Upon successful acquisition of the selected feature or utility, wireless services provider 310 or content provider 320 may permit one or more devices (e.g., device 100 or devices 300) in the group to access the acquired feature and/or utility and may deduct one or more units of credit from the subscription account associated with device 100. Wireless service provider 310 or content provider 320 may send to device 100 an electronic key for accessing the acquired feature or utility or send the acquired feature or utility to be stored in memory 290 of device 100.

Application for Data Sharing

Figure 8:
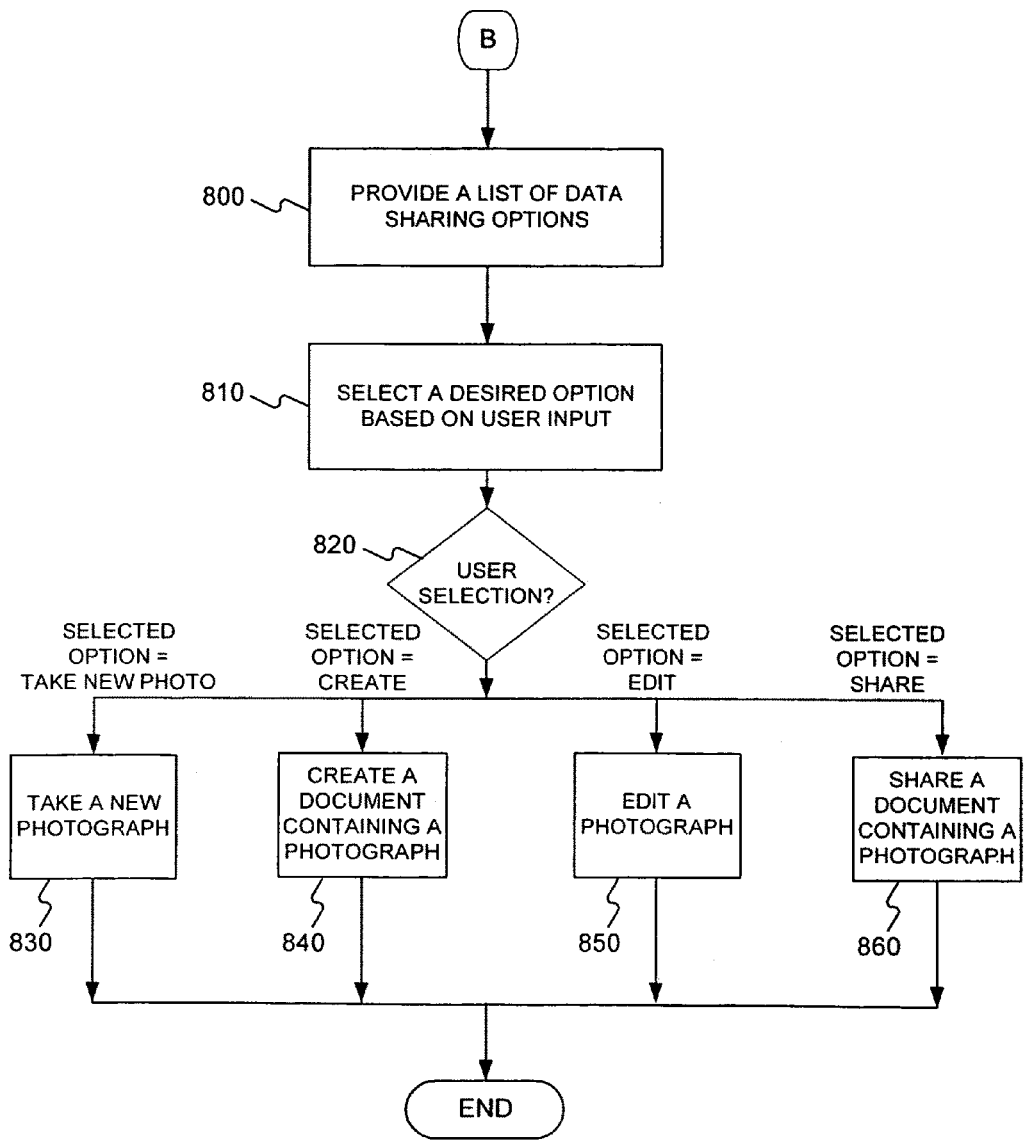
FIG. 8 illustrates a flow diagram of an exemplary method for sharing data between portable communication devices associated in a group, consistent with the present disclosure.

The operation of exemplary user interfaces 900-930 (as shown in FIGS. 9A-D) will now be described with reference to FIG. 8. FIG. 8 illustrates a flow diagram of an exemplary method for sharing data between portable communication devices (e.g., device 100 and devices 330) associated in a group. Although FIG. 8 is described in relation to device 100, the exemplary method illustrated in FIG. 8 may also be carried out by the user operating a computer (e.g., computer system 1100 as shown in FIG. 11). The exemplary method for sharing data simplifies data upload and download from a portable communication device (e.g., device 100 or devices 330) to a central data repository (e.g., content 400) for sharing with other devices in the group.

In stage 800, device 100 may provide a list of data sharing options from system memory 290C. If the requested list is not found within system memory 290C, then device 100 may request the page from content server 322. Upon retrieving the list from system memory 290C, content server 322, or any other source, device 100 may display the list of data sharing options (e.g., Take New Photo link 930, Create link 935, Edit link 940, and Share link 945 as shown in user interface 900 of FIG. 9A).

Next, in stage 810, device 100 may select, based on the user's input, a desired data sharing option that the user wishes to perform. The user may select a data sharing option by, for example, operating keypad 142, issuing voice command into microphone 110, transmitting RF communication signals to antenna 120, and/or operating display 130 (e.g., a touch-screen). In stage 820, device 100 determines a selected data sharing option based on user input. If the user selects Take New Photo link 93, device 100 may proceed to stage 830 to take one or more new photographs using camera 150 (as illustrated in FIG. 1B), store the new photographs in memory 290 of device 100, and/or upload the new photographs to content 400 via content server 322.

Figures 9A, 9B:
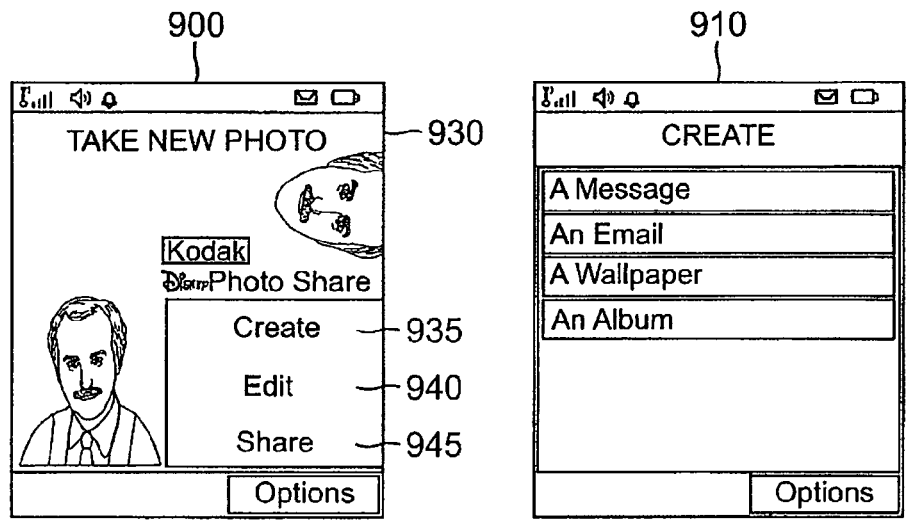
FIGS. 9A-D show exemplary screen displays for sharing data between portable communication devices associated in a group, consistent with the present disclosure.

Alternatively, if the user selects Create link 935, device 100 may proceed to stage 840. In stage 840, device 100 may display user interface 910 (as illustrated in FIG. 9B), and based on user selection, create a message containing one or more photographs, an electronic mail containing one or more photographs, a wallpaper containing one or more photographs, and/or a photo album containing one or more photographs. A message may be in a standard format (e.g., MMS, EMS, and the like) or a custom format, and may be stored in memory 290 of device 100 or uploaded to content server 322 to be stored in content 400. A message stored in content 400 may be sent to or accessed by the group's members (e.g., device 100 or devices 330). An electronic mail may be in a standard format (e.g., Simple Mail Transfer Protocol, Hyper-Text Transfer Protocol) or a custom format. Sent or received electronic mail may be, for example, stored in memory 290 of device 100 or in content 400. An electronic mail stored in content 400 may be sent to or accessed by the group's members. A wallpaper may be, for example, stored in memory 290 of device 100 or in content 400. A wallpaper stored in content 400 may be shared among or accessed by the group's members. A photo album may be, for example, stored in memory 290 of device 100 or in content 400. A photo album stored in content 400 may be shared among or accessed by the group's members.

Figures 9C, 9D:
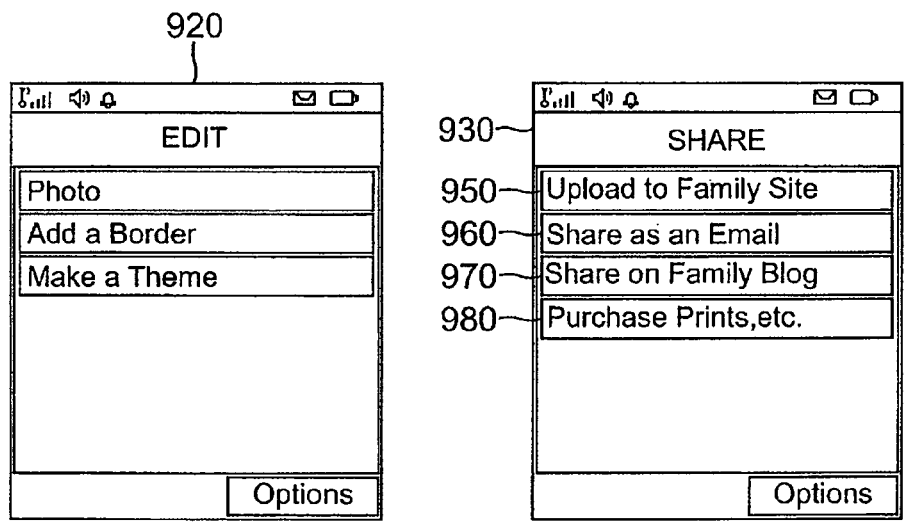

If, in stage 810, the user selects Edit link 940, device 100 may proceed to stage 850. In stage 850, device 100 may display user interface 920 (as illustrated in FIG. 9C), and based on user selection, allow the user to edit, customize, and/or enhance one or more photographs. For example, device 100 may select a photo based on user input to allow the user to edit the selected photo, add a border to the selected photo, make a theme based on the selected photo, etc.

If the user selects Share link 945 in stage 810, device 100 may proceed to stage 860. In stage 860, device 100 may display user interface 930 (as illustrated in FIG. 9D), and based on user selection, device 100 may send one or more photographs to a web site shared by the group (i.e., the user selects Upload to Family Site link 950), share one or more photographs as an electronic mail (i.e., the user selects Share as an Email link 960), share one or more photographs on a group electronic journal (i.e., the user selects Share on Family Blog link 970), or allow the user to purchase products based on one or more photographs (i.e., the user selects Purchase Prints link 980). The products may include photograph prints, posters, photograph albums, compact discs (CD) containing photographs, digital video discs (DVD) containing photographs, personalized merchandise (e.g., shirts and mugs with imprinted photographs), and the like.

Application for Group Messaging

Figure 10:
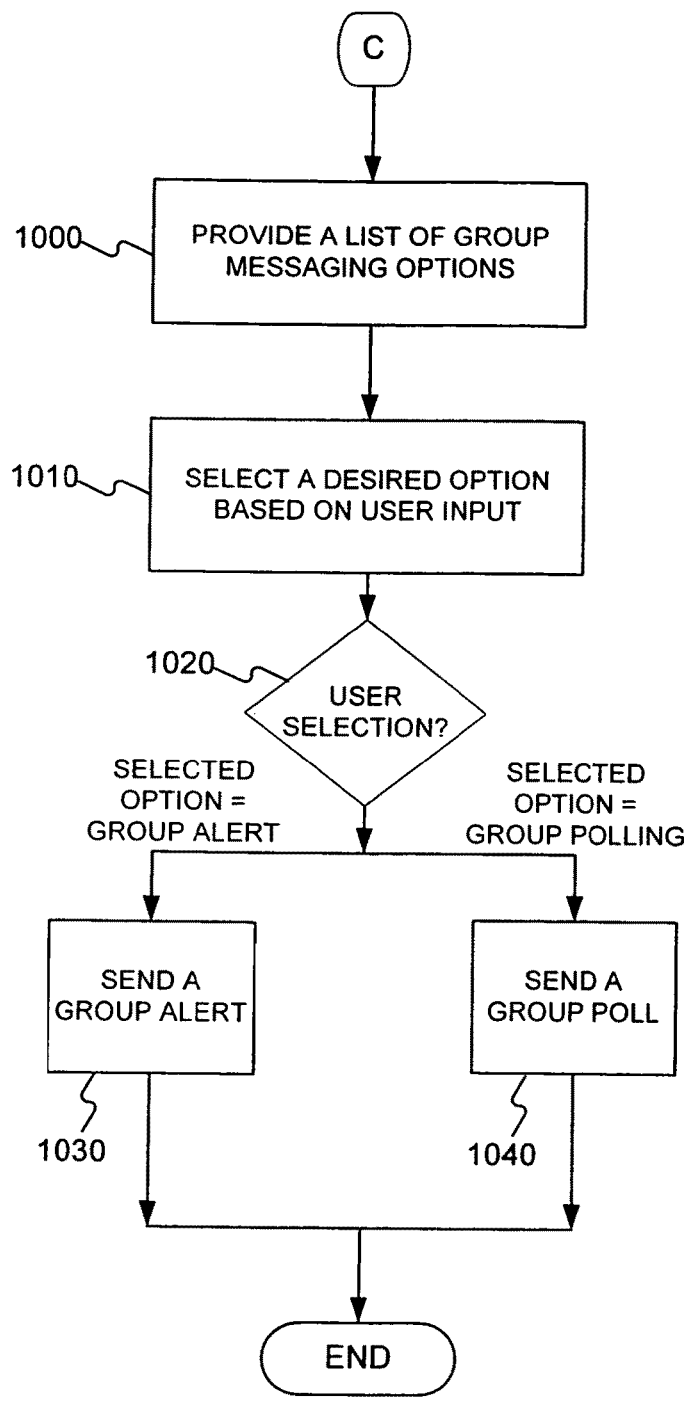
FIG. 10 illustrates a flow diagram of an exemplary method for sending, receiving, and processing messages to and from portable communication devices in a group, consistent with the present disclosure.

FIG. 10 illustrates a flow diagram of an exemplary method for sending, receiving, and processing messages to and from portable communication devices (e.g., device 100 and devices 330) associated in a group. Although FIG. 10 is described in relation to device 100, the exemplary method illustrated in FIG. 10 may also be carried out by the user operating a computer (e.g., computer system 1100 as shown in FIG. 11). In stage 1000, device 100 may provide a list of group messaging options from system memory 290C. If the requested list is not found within system memory 290C, then device 100 may request the page from content server 322. Upon retrieving the list from system memory 290C, content server 322, or any other source, device 100 may display the list of group messaging options (e.g., group alert and group poll).

Next, in stage 1010, device 100 may select, based on the user's input, a desired group messaging option that the user wishes to perform: The user may select a group messaging option by, for example, operating keypad 142, issuing voice command into microphone 110, transmitting RF communication signals to antenna 120, and/or operating display 130 (e.g., a touch-screen). In stage 1020, device 100 determines a selected group messaging option based on user input.

If the user selects the "group alert" option, device 100 may proceed to stage 1030 to send an alert message directly to selected or all devices (e.g., devices 330) in the group or send an alert message to wireless provider 310 and/or content server 322 to distribute the alert message to selected or all devices in the group. The alert message may be a new or pre-recorded message of any type (e.g., voice message, text message, SMS, EMS, MMS, and the like). The user may also designate a level of priority (e.g., high, low) for the alert message to indicate the importance of the alert message and/or types of action required of a recipient device. For example, if the user indicates that a group alert has a "high" level of priority, the alert message may be displayed on a recipient device's screen upon receipt, and any user activity on the recipient device may be suspended until the recipient device acknowledges receipt of the alert message. For another example, if the user indicates that a group alert has a "low" level of priority, the alert message may be displayed on a recipient device's screen upon receipt, and user activity may resume on the recipient device without acknowledging receipt of the alert message.

Alternatively, if the user selects the "group poll" option, device 100 may proceed to stage 1040 to send a poll directly to selected or all devices (e.g., devices 330) in the group and/or send a poll to wireless provider 310 and/or content server 322 to distribute the poll to selected or all devices in the group. A poll may be sent and distributed using a standard messaging format or protocol (e.g., SMS, EMS, MMS, Simple Mail Transfer Protocol, HyperText Transfer Protocol, and the like) or a custom format, and may be stored in memory 290 of device 100 or uploaded to content server 322 to be stored in content 400. A poll stored in content 400 may be sent to or accessed by the group's members (e.g., device 100 or devices 330). An exemplary poll may include a question (e.g., "where do you want to go for dinner tonight"), followed by one or more possible answers (e.g., "1: Chinese Food; 2: American Food; 3: Lebanese Food.").

The user may also specify a poll completion threshold. A poll completion threshold may include one or more thresholds, including, for example, completion time, number of votes received, percentage of polled group members voted, or a combination thereof. For example, the user may specify that a group poll ends at either five o' clock or when at least three members in the group have voted. Upon completion of the poll, device 100, wireless provider 310, and/or content server 322 may distribute the poll results to selected or all devices in the group.

Systems and methods consistent with the present invention may be implemented by computers organized in a conventional distributed processing system architecture. FIG. 11 is a block diagram illustrating a computer system 1100 in which an embodiment consistent with the invention may be implemented. Computer system 1100 includes a computer 1101 having a bus 1102 or other communication mechanism for communicating information, and a processor 1104 coupled with bus 1102 for processing information. Computer 1101 also includes a main memory, such as random access memory (RAM) 1106 or other dynamic storage device, coupled to bus 1102 for storing information and instructions by processor 1104. RAM 1106 also may be used for storing temporary variables or other intermediate information during execution of instructions to be executed by processor 1104. During operation, some or all portions of an operating system (not shown) are loaded into RAM 1106. Computer 1101 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer 1101 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball or cursor direction keys for communicating direction information and command selections to processor 1104 and for controlling cursor movement on display 1112. This input device may have two degrees of freedom in two axes, a first axis (e.g., x) and a second axis (e.g., y), which allow the device to specify positions in a plane.

Computer system 1100 may further include an input drive device 1117, such as a CD reader, for reading high-capacity computer-readable media, such as CD-ROMs and CDRs. The invention may utilize computer system 1100 for mobile device applications and graphical user interfaces that provide for management, coordination, monitoring, and data sharing of electronic devices that are associated in a group. According to one implementation, systems and methods consistent with the present invention enable group management and coordination, connectivity management, data sharing, group monitoring, and graphical user interfaces for associated mobile electronic devices having small-screen electronic displays in response to processor 1104 executing one or more sequences of one or more instructions contained in RAM 1106. Such instructions may be read into RAM 1106 from a computer-readable medium via an input device such as storage device 1110. Execution of the sequences of instructions contained in main memory 1106 causes processor 1104 to perform the process steps described herein. For example, the sequences of instructions may be a web-enabled application (e.g., application for shopping and purchasing features and utilities, application for data sharing, etc.) that displays web browser-based user interfaces accessible to users over the Internet. Further, web browser-based user interfaces may be developed using high-level programming languages such as Java®, C#, or ASP+, and may be deployed on servers such as a WebSphere application server and Apache HTTP server. In an alternative implementation, hard-wired circuitry may be used in place of or in combination with software instructions to implement the invention. Thus, implementations consistent with the principles of the present invention are not limited to any specific combination of hardware circuitry and software.

Computer 1101 also includes a communication interface 1118 coupled to bus 1102. Communication interface 1118 provides a two-way data communication coupling to a network link 1120 that is connected to local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to host computer 1124 (e.g., content server 322, wireless server 312, and the like) and/or to data equipment operated by Internet Service Provider (ISP) 1126. ISP 1126, in turn, provides data communication services through the Internet 1128. Local network 1122 and Internet 1128 both use electric, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 (e.g., content server 322, wireless server 312, and the like) might transmit a requested code for an application program through Internet 1128, ISP 1126, local network 1122 and communication interface 1118. The received code may be loaded in RAM 1106 and executed by processor 1104 as it is received. Alternatively, or in addition, it may be stored in storage device 1110, or other non-volatile storage for later execution. In this manner, computer system 1100 may obtain application code in the form of a carrier wave.

Although computer system 1100 is shown in FIG. 11 as being connectable to one server 1130, those skilled in the art will recognize that computer system 1100 may establish connections to multiple servers on Internet 1128. Such servers may include an HTML-based Internet application, which may provide information to computer system 1100 upon request in a manner consistent with the present invention.

As described above, systems and methods consistent with the present disclosure provide for intuitive navigation across broad content, without regard to the size of the display screen or the type of user input devices present on the device. Further, systems and methods consistent with the present disclosure provide users with group management tools, group monitoring tools, and user interfaces for managing associated electronic devices. Other embodiments of the present disclosure will be apparent to those skilled in the art from consideration of the specification and practice of the concepts disclosed herein. It is intended that the specification and examples be considered as exemplary only, with a true scope and spirit of the invention indicated by the following claims.

What is claimed is:

1. A method comprising:
selecting at least one target portable communication device from a group of a plurality of portable communication devices;
sending a message by a primary portable communication device to the at least one target portable communication device, wherein the message requires an acknowledgement of the message from the at least one target portable communication device, and wherein the message suspends user activity on the at least one target portable communication device prior to the acknowledgement;
determining a list of features available for acquisition based on a device identifier of the primary portable communication device;
providing the list of available features to a user;
obtaining a selected feature from the list of available features; and
acquiring the selected feature.

2. The method of claim 1, wherein the message is in a format designed for transmission via a service selected from at least one of Multimedia Message Service (MMS) and Enhanced Messaging Service (EMS).

3. The method of claim 1, wherein the message is in a format designed for transmission via a protocol selected from at least one of Simple Mail Transfer Protocol (SMTP), Hyper-Text Transfer Protocol (HTTP), and Wireless Application Protocol (WAP).

4. The method of claim 1 further comprising:
determining whether a subscription account associated with the group has sufficient amount of credit for acquiring the selected feature;
if it is determined that the group has sufficient amount of credit, obtaining the selected feature; and
if it is determined that the group has insufficient amount of credit, notifying the user that the group has insufficient amount of credit.

5. The method of claim 1, wherein providing the list of available features further comprises: prioritizing the list of available features based on a user profile associated with the primary portable communication device; and providing the prioritized list of available features.

6. A system comprising:
a processor configured to:
select at least one target portable communication device from a group of a plurality of portable communication devices; and
send a message by a primary portable communication device to the at least one target portable communication device, wherein the message requires an acknowledgement of the message from the at least one target portable communication device, and wherein the message suspends user activity on the at least one target portable communication device prior to the acknowledgement;
determine a list of features available for acquisition based on a device identifier of the primary portable communication device;
provide the list of available features to a user;
obtain a selected feature from the list of available features; and
acquire the selected feature.

7. The system of claim 6, wherein the message is in a format designed for transmission via a service selected from at least one of Multimedia Message Service (MMS) and Enhanced Messaging Service (EMS).

8. The system of claim 6, wherein the message is in a format designed for transmission via a protocol selected from at least one of Simple Mail Transfer Protocol (SMTP), Hyper-Text Transfer Protocol (HTTP), and Wireless Application Protocol (WAP).

9. The system of claim 6, wherein the processor is further configured to:
determine whether a subscription account associated with the group has sufficient amount of credit for acquiring the selected feature;
obtain the selected feature if the credit checking module determines that the group has sufficient amount of credit; and
notify the user that the group has insufficient amount of credit if the processor determines that the group has insufficient amount of credit.

10. The system of claim 6, wherein the processor is further configured to:
prioritize the list of available features based on a user profile associated with the portable communication device; and
provide the prioritized list of available features.

11. A method comprising:
selecting at least one target portable communication device from a group of a plurality of portable communication devices;
sending a message by a primary portable communication device to the target portable communication device, wherein the message requires an acknowledgement of the message from the target portable communication device, and wherein the message suspends user activity on the target portable communication device prior to the acknowledgement;
selecting a plurality of target portable communication devices from the group of the plurality of portable communication devices;
sending a poll to the target portable communication devices;
receiving one or more votes from the target portable communication devices in response to the poll;
determining whether a poll completion threshold has been reached; and
if it is determined that the poll completion threshold has been reached, sending a poll result to the target portable communication devices.

12. The method of claim 11, wherein the poll completion threshold includes at least one of completion time, number of votes received, and percentage of polled group members voted.

13. A system comprising:
a processor configured to:
select at least one target portable communication device from a group of a plurality of portable communication devices; and
send a message by a primary portable communication device to the target portable communication device, wherein the message requires an acknowledgement of the message from the target portable communication device, and wherein the message suspends user activity on the target portable communication device prior to the acknowledgement;
select a plurality of target portable communication devices from the group of the plurality of portable communication devices;
send a poll to the target portable communication devices;

receive one or more votes from the target portable communication devices in response to the poll;

determine whether a poll completion threshold has been reached; and send a poll result to the target portable communication devices if it is determined that the poll completion threshold has been reached.

14. The system of claim 13, wherein the poll completion threshold includes at least one of completion time, number of votes received, and percentage of polled group members voted.

15. A method comprising:

selecting a plurality of target portable communication devices from a group of portable communication devices;

sending a poll to the plurality of target portable communication devices;

receiving one or more votes from the plurality of target portable communication devices in response to the poll;

determining whether a poll completion threshold has been reached; and if it is determined that the poll completion threshold has been reached, sending a poll result to the plurality of target portable communication devices.

16. The method of claim 15, wherein the poll completion threshold includes at least one of completion time, number of votes received, and percentage of polled group members voted.

17. A system comprising:

a processor configured to:

select a plurality of target portable communication devices from a group of portable communication devices;

send a poll to the plurality of target portable communication devices;

receive one or more votes from the plurality of target portable communication devices in response to the poll;

determine whether a poll completion threshold has been reached; and if it is determined that the poll completion threshold has been reached, send a poll result to the plurality of target portable communication devices.

18. The system of claim 17, wherein the poll completion threshold includes at least one of completion time, number of votes received, and percentage of polled group members voted.

19. A method for use by a primary communication device selected from a group of a plurality of portable communication devices, the method comprising:

receiving a list of features available for acquisition based on a device identifier of the primary portable communication device;

providing the list of available features to a user;

obtaining a selected feature from the list of available features; and acquiring the selected feature.

20. The method of claim 19 further comprising:

determining whether a subscription account associated with the group has sufficient amount of credit for acquiring the selected feature;

if it is determined that the group has sufficient amount of credit, obtaining the selected feature; and if it is determined that the group has insufficient amount of credit, notifying the user that the group has insufficient amount of credit.

21. The method of claim 19, wherein providing the list of available features further comprises: prioritizing the list of available features based on a user profile associated with the primary portable communication device; and providing the prioritized list of available features.

22. A primary communication device selected from a group of a plurality of portable communication devices, the primary communication device comprising:

a processor configured to:

receive a list of features available for acquisition based on a device identifier of the primary portable communication device;

provide the list of available features to a user;

obtain a selected feature from the list of available features; and acquire the selected feature.

23. The primary communication device of claim 22, wherein the processor is further configured to:

determine whether a subscription account associated with the group has sufficient amount of credit for acquiring the selected feature;

if it is determined that the group has sufficient amount of credit, obtain the selected feature; and if it is determined that the group has insufficient amount of credit, notify the user that the group has insufficient amount of credit.

24. The primary communication device of claim 22, wherein the processor is further configured to provide the list of available features by: prioritizing the list of available features based on a user profile associated with the primary portable communication device; and providing the prioritized list of available features.

* * * * *